United States Patent [19]

Brandenburg

[11] 4,319,806
[45] Mar. 16, 1982

[54] ANTIGLARE REAR VIEW MIRROR

[75] Inventor: Darrell L. Brandenburg, Anderson, Ind.

[73] Assignee: General Motors Corporation, Detroit, Mich.

[21] Appl. No.: 167,414

[22] Filed: Jul. 11, 1980

[51] Int. Cl.³ .................................................. B60R 1/04
[52] U.S. Cl. .................................................. 350/281
[58] Field of Search ............... 350/280, 302, 159, 276, 350/279, 281; 404/14–16

[56] References Cited
U.S. PATENT DOCUMENTS 3,870,404  3/1975  Wilson et al. .................... 350/281

FOREIGN PATENT DOCUMENTS 148324   2/1950  Australia ........................ 350/280
1274210  5/1972  United Kingdom ............ 350/280

*Primary Examiner*—John K. Corbin
*Assistant Examiner*—Rebecca D. Gass
*Attorney, Agent, or Firm*—Edward J. Biskup

[57] ABSTRACT

An antiglare rear view mirror having an actuator assembly formed with a bearing surface at one end and a rotatable positioning member at the other end that are mounted between a pair of projecting flange members formed on the housing which carries the mirror element and in which the flange members are drawn towards each other for placing the actuator assembly in compression to thereby ensure that the housing maintains its position when moved to the "day" position or the "night" position.

2 Claims, 7 Drawing Figures

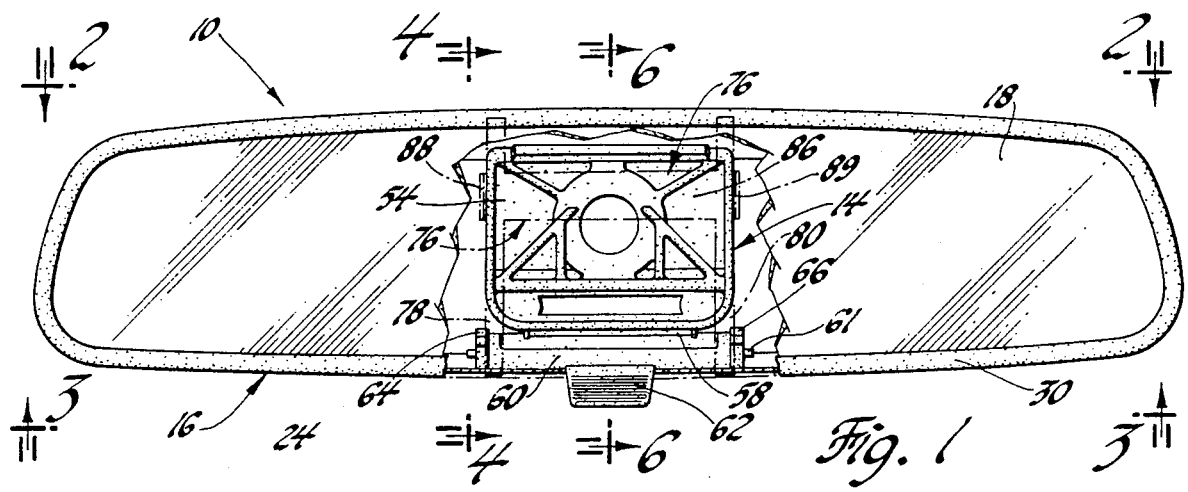

ANTIGLARE REAR VIEW MIRROR

This invention concerns an antiglare rear view mirror of the type which includes a tiltable prismoidal mirror element having two reflecting surfaces of different reflecting powers that are selectively tilted to present one or the other for viewing.

More specifically, the antiglare rear view mirror according to the present invention includes a housing which has the prismoidal mirror element secured thereto and has a back wall integrally formed with forwardly projecting upper and lower flange members, each of which has an elongated well formed therein along the longitudinal axis of the housing. The back wall of the housing is formed with a first aperture through which one end of a support extends into the interior of the housing for rigid connection with an actuator assembly. The actuator assembly has a body portion made of plastic material that has a bearing surface formed at the upper end thereof that is located in the well in the upper flange member for allowing the housing to pivot about a first horizontal axis relative to the body portion. A flexible hinge made of a plastic material connects the lower end of the body portion to a cylindrical member which is located in the well in the lower flange member and is adapted to rotate about a second horizontal axis. A tab member is rigidly connected to the cylindrical member and extends through an aperture formed in the well in the lower flange member for manual movement between first and second positions. The arrangement of the aforementioned parts is such that when the tab member is moved between the first and second positions, the cylindrical member is rotated about the second horizontal axis with resultant pivotal movement of the housing about the first horizontal axis so as to present one or the other of the reflecting surfaces on the prismoidal mirror element to the viewer. In addition, a strap is provided that connects the upper flange member to the lower flange member so as to draw the flange members towards each other and thereby apply a compressive load to the body portion and the cylindrical member at the flexible hinge to ensure that the housing, and accordingly the prismoidal mirror element, maintains its position when placed in the first position or the second position.

The objects of the present invention are: to provide a new and improved antiglare rear view mirror having two reflecting surfaces and which includes a housing connected to an actuator assembly formed with upper and lower bearing portions that are maintained under a compressive load for ensuring that one or the other of the reflecting surfaces is maintained in a predetermined position; to provide a new and improved antiglare rear view mirror having an actuator assembly formed with a bearing surface at one end and a rotatable positioning member at the other end that are mounted between a pair of projecting flange members formed on the housing which carries the mirror element and in which the flange members are drawn towards each other for placing the actuator assembly in compression to thereby ensure that the housing maintains its position when moved to the "day" position or the "night" position; to provide a new and improved antiglare rear view mirror including a support housing combined with an actuator assembly which is mounted within the support housing and is firmly maintained therein by a strap which applies a compressive force to the actuator assembly; and to provide a new and improved antiglare rear view mirror in which an actuator assembly located within a support housing is made of a plastic material and after it is mounted in the support housing, the actuator assembly is preloaded in a vertical direction by a spring member so as to prevent vibrations transmitted to the actuator assembly during vehicle travel from disturbing the position of the support housing when the latter is manually set in the "day" position of the "night" position.

Other objects and advantages of the present invention will be apparent upon reading the following detailed description when taken with the accompanying drawings, in which:

FIG. 1 is a front elevational view of an antiglare rear view mirror made in accordance with the present invention;

FIG. 2 is a top view of the antiglare rear view mirror taken on line 2—2 of FIG. 1.

FIG. 3 is a bottom view of the antiglare rear view mirror taken on line 3—3 of FIG. 1;

FIG. 4 is a sectional view of the antiglare rear view mirror taken on line 4—4 of FIG. 1, and shows the mirror in the "day" viewing position;

FIG. 5 is a view similar to FIG. 4, but shows the mirror in the "night" viewing position;

FIG. 6 is a sectional view taken on the line 6—6 of FIG. 1; and

Figure 7:
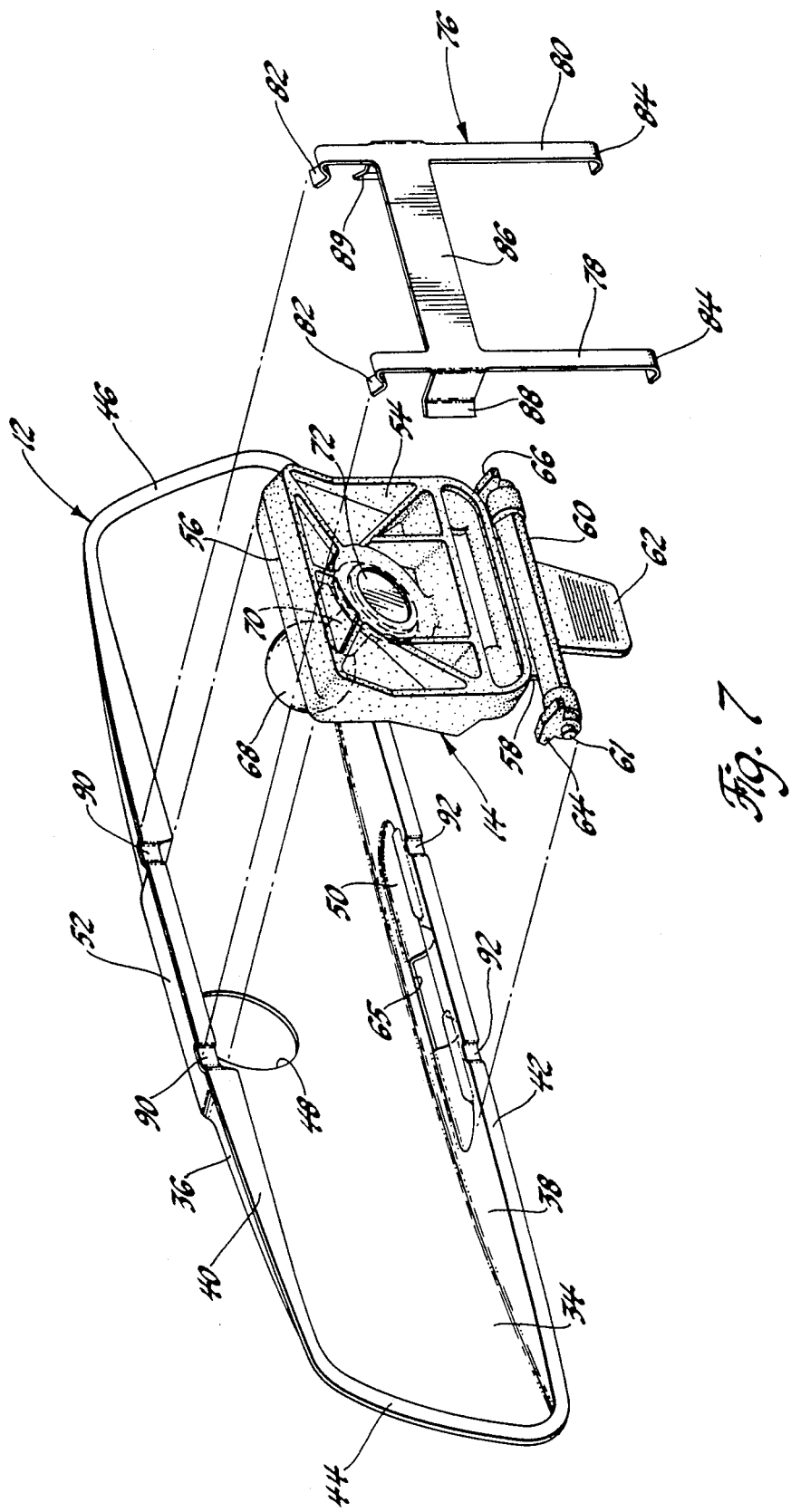
FIG. 7 is an exploded view showing the various parts of the antiglare rear view mirror, except for the prismoidal mirror element and the retainer thereof.

Referring to the drawings, an antiglare rear view mirror 10 is shown comprising a housing 12, an actuator assembly 14 and a mirror assembly 16. The antiglare rear view mirror 10 provides an arrangement wherein the housing 12 and accordingly the mirror assembly 16 is selectively pivoted between two viewing positions, namely a "day" position which is used under conditions of normal visibility and a "night" position which is used to provide a rearward image of reduced intensity such as is desirable to reduce the headlight glare from a following vehicle.

The mirror assembly 16 includes a conventional prismoidal mirror element 18 that is generally wedge-shaped when viewed in transverse cross section. More specifically, the mirror element 18 includes upwardly diverging front and rear reflecting surfaces which are respectively identified by the reference numerals 20 and 22. The rear reflecting surface 22 is provided with a reflective coating formed by any suitable process, such as aluminizing. With this construction, different reflecting powers are provided by the front reflecting surface 20 and the rear reflecting surface 22. Preferably, the front reflecting surface 20 has an approximate 4% reflectivity, while the rear reflecting surface 22 has approximately a 90% reflectivity. Therefore, by manually selectively positioning the mirror element 18, the operator of a vehicle can present for viewing the reflecting surface best suited to his immediate driving requirements.

As best seen in FIGS. 1 and 4, the mirror element 18 is supported by a retainer 24 which is adapted to be secured to the housing 12. The retainer 24 is molded as a single piece from a plastic material and generally comprises a vertically oriented base 26 which includes a forwardly projecting peripheral flange 28 that terminates with an inwardly turned rim 30. The flange 28 and the rim 30 define a forwardly opening cavity 32 which is slightly smaller in peripheral configuration than the mirror element 18. In assembly, the mirror element 18 is snapped or pressed into the mirror cavity 32 and securely held therein by the resiliency of the flange 28 and the rim 30.

Referring now to FIGS. 1 through 4, the housing 12 is formed from a single piece of sheet metal and generally comprises a back wall 34 which is integrally formed with forwardly projecting upper and lower flange members 36 and 38. As best seen in FIG. 7, the upper and lower flange members 36 and 38 terminate with outwardly turned horizontal rim members 40 and 42 respectively which extend the length of each of the associated flange members and connect with laterally spaced and substantially vertically oriented rim members 44 and 46 formed on the opposite ends of the housing 12. The rim members 40, 42, 44, and 46 are located in a common plane so as to provide a flat support surface to which the mirror assembly 16 is connected by a suitable adhesive. It will be noted that a circular aperture 48 is formed in the upper portion of the back wall 34 and, in addition, the lower flange member 38 is formed with an elongated well 50 which is concave in cross-section. The upper flange member 36 has a raised section 52 formed therein above the aperture 48. Thus, when the mirror assembly 16 is attached to the housing 12, the raised section 52 forms a pocket or well which is located opposite to the well 50 formed in the lower flange member 38.

The actuator assembly 14 is located within the housing 12 and comprises a generally rectangular body portion 54, the upper end of which has a bearing surface 56 that is normally located within the raised section 52 formed in the upper flange member 36. The lower end of the body portion 54 is connected by an integral plastic hinge 58 to an elongated cylindrical member 60 which has a metal reinforcing rod 61 that extends through the center thereof from one end to the other. The cylindrical member 60, in turn, is integrally formed with a downwardly depending tab member 62. The opposite ends of the cylindrical member 60 are integrally formed with identical stops 64 and 66 which serve to properly position the housing 12 in the "day" viewing position and "night" viewing position, as will be hereinafter explained. The cylindrical member 60 is located within the well 50 formed in the lower flange member 38, while the tab member 62 extends through an aperture 65 in the well 50 to a position exteriorly of the housing 12 and is readily accessible for manual movement between the "day" viewing position, as seen in FIG. 4, and the "night" viewing position, as seen in FIG. 5. The body portion 54 of the actuator assembly 14 is fixed to a mirror support 67 which, as seen in FIG. 6, includes a spherical ball 68 and a neck 70 of a reduced diameter. The neck 70 is connected to a stepped reinforcing plate 72 which is secured to the body portion 54 of the actuator assembly 14 during the molding process. The spherical ball 68 is connected to a suitable socket member 74 for universal movement and is connected therethrough to a vehicle windshield (not shown) in the normal manner.

As seen in FIGS. 4 and 6, the antiglare rear view mirror 10 is shown positioned in the "day" viewing position to present the rear reflecting surface 22 to the viewer. During such time, the flexible hinge 58 which connects the body portion 54 to the cylindrical member 60, is located forwardly of the longitudinal center axis of the cylindrical member 60. When it is desired to move the antiglare rear view mirror 10 to the "night" viewing position so as to present the front reflecting surface 20 to the viewer, the tab member 62 is moved forwardly or in a counterclockwise direction about the central horizontal axis extending through the rod 61, as viewed in FIGS. 4 and 6, until the stop 64 limits further movement at which time the tab member 62 will assume the position shown in FIG. 5. This movement of the tab member 62 causes the cylindrical member 60 to shift forwardly to a point where the aforementioned central horizontal axis is located forwardly of the flexible hinge 58. This then causes the housing 12 to tilt about the upper bearing surface 56 in a counterclockwise direction and to position the mirror element 18 so that the front reflecting surface 20 is then presented for rearward viewing.

In order to help maintain the antiglare rear view mirror 10 in the "day" viewing position or the "night" viewing position as described above, an H-shaped strap 76 is provided which, as seen in FIG. 7, comprises a pair of parallel and laterally spaced arms 78 and 80, each of which has the upper and lower ends thereof curled-over inwardly to provide hook-type ends 82 and 84 respectively. The arms 78 and 80 are interconnected by a transversely extending bar member 86 and each is integrally formed with outwardly projecting tangs 88 and 89 which prevent the actuator assembly 14 from moving sideways relative to the housing 12. It will be noted that after the actuator assembly 14 is mounted within the housing 12 so that it assumes the position shown in FIG. 6, the strap 76 is then connected between the rim member 40 formed on the upper flange member 36 and the rim member 42 formed on the lower flange member 38. In this connection, it will be noted that the rim members 40 and 42 are formed with two pair of vertically aligned depressed portions 90 and 92 into which the arms 78 and 80 of the strap 76 are located. Accordingly, during assembly and as best seen in FIG. 6, the hook-type ends 84 of the arms 78 and 80 are initially aligned with the depressed portions 92 and positioned under the rim member 42 and afterwards the hook-type ends 82 of the arms 78 and 80 are snapped over the upper rim member 40 into the depressed portions 90. The strap 76 is made of spring steel and is sized so that upon hooking the upper and lower ends of the arms 78 and 80 to the rim members 40 and 42 a compressive load is placed upon the actuator assembly 14. This compressive load serves to maintain the actuator assembly 14, and accordingly the housing 12, in the preset positions shown in FIG. 4 and FIG. 5. This then ensures that any vibrations which may be transmitted to the antiglare rear view mirror 10 during the normal vehicle travel will not in any way disturb the position of the housing 12 or the mirror element 18. It will also be noted that tangs 88 and 89 formed with strap 76 engage the sides of the body portion 54 of the actuator assembly 14 and serve as an additional support for the body portion 54 to thereby limit the vibration of the antiglare rear view mirror 10.

It should be apparent that after the strap 76 is connected to the housing 12, as described above, the mirror assembly 16 is then connected to the rim members 40, 42, 44 and 46 of the housing 12 through the use of an appropriate adhesive.

Various changes and modifications can be made in this construction without departing from the spirit of the invention. Such changes and modifications are contemplated by the inventor, and he does not wish to be limted except by the scope of the appended claims.

The embodiments of the invention in which an exclusive property or privilege is claimed are defined as follows:

1. An anti-glare rear view mirror comprising a housing which supports a mirror element having two reflecting surfaces of different reflecting powers, said housing including a back wall integrally formed with forwardly extending upper and lower flange members each of which has an elongated well formed therein, said back wall having a first aperture formed therein, a second aperture formed in said well in the lower flange member, a support extending through said first aperture into the interior of said housing, an actuator assembly in said housing including a body portion made of a plastic material and rigidly connected to one end of said support, said body portion having a bearing surface formed at the upper end thereof located in said well in said upper flange member for allowing said housing to pivot about a first horizontal axis relative to said body portion, an elongated cylindrical member located in said well in said lower flange member for rotation about a second horizontal axis and being formed with a tab member which extends through the second aperture and is accessible for manual movement between first and second positions, a flexible hinge connecting the lower end of said body portion to said cylindrical member whereby movement of said tab member between said first and second positions causes said cylindrical member to rotate about said second horizontal axis with resultant pivotal movement of said housing about said first horizontal axis so as to present one or the other of said reflecting surfaces to the viewer, and means connecting said upper flange member to said lower flange member so as to draw said flange members towards each other and thereby apply a preload to said body portion and said cylindrical member at said flexible hinge to ensure that said housing maintains its position when placed in said first position or in said second position.

2. An anti-glare rear view mirror comprising a housing which supports a mirror element having two reflecting surfaces of different reflecting powers, said housing including a back wall integrally formed with forwardly extending upper and lower flange members each of which has an elongated well formed therein, said back wall having a first aperture formed therein between said wells in the upper and lower flange members, a second aperture formed in said well in the lower flange member, a support extending through said first aperture into the interior of said housing, an actuator assembly in said housing including a body portion made of a plastic material and having a central portion thereof rigidly connected to one end of said support, said body portion having a bearing surface formed at the upper end thereof located in said well in said upper flange member for allowing said housing to pivot about a first horizontal axis relative to said body portion, an elongated cylindrical member located in said well in said lower flange member for rotation about a second horizontal axis and being integrally formed with a tab member which extends through the second aperture and is accessible for manual movement between first and second positions, a flexible hinge made of plastic material integrally connecting the lower end of said body portion to said cylindrical member whereby movement of said tab member between said first and second positions causes said cylindrical member to rotate about said second horizontal axis with resultant pivotal movement of said housing about said first horizontal axis so as to present one or the other of said reflecting surfaces to the viewer, and a strap comprising a pair of arms interconnected by a cross member, each of said arms having a hook portion at the opposite ends thereof for connecting said upper flange member to said lower flange member so as to draw said flange members towards each other and thereby apply a preload to said body portion and said cylindrical member at said flexible hinge to assure that said housing maintains its position when placed in said first position or in said second position.

* * * * *